United States Patent [19]

Black

[11] 4,069,894

[45] Jan. 24, 1978

[54] LUBRICATING TOOL FOR CONTROL CABLES

[76] Inventor: Clyde A. Black, 101 Seymour, Fort Worth, Tex. 76114

[21] Appl. No.: 737,118

[22] Filed: Oct. 29, 1976

[51] Int. Cl.² .......................................... F16N 7/36
[52] U.S. Cl. ................................. 184/15 R; 401/11; 15/256.6
[58] Field of Search ................. 184/15 R, 16, 15 A, 184/15 B, 12, 5, 102; 15/256.6; 401/9–11, 196, 207; 118/266, 234, 208, 109

[56] References Cited

U.S. PATENT DOCUMENTS

| 296,645 | 4/1884 | Stubbe | 184/15 R |
|---|---|---|---|
| 1,049,170 | 12/1912 | Thomas | 184/15 R |
| 1,208,865 | 12/1916 | Warwick | 401/11 |
| 2,053,705 | 9/1936 | Durnell et al. | 184/16 UX |
| 2,140,426 | 12/1938 | Hodson | 184/15 R |
| 2,255,154 | 9/1941 | Esposito | 184/16 |
| 2,531,095 | 11/1950 | Williams | 184/16 |
| 2,604,650 | 7/1952 | Mottleson | 184/16 |
| 2,930,061 | 3/1960 | O'Neil | 401/11 |
| 3,783,972 | 1/1974 | Molstad | 184/15 R |
| 3,823,797 | 7/1974 | Ducatillon | 184/16 |
| 3,889,781 | 6/1975 | Schott et al. | 184/15 R |
| 3,951,235 | 4/1976 | Acerbi | 184/15 R |
| 3,989,388 | 11/1976 | Sparr | 401/11 |

*Primary Examiner*—David H. Brown
*Attorney, Agent, or Firm*—Joseph E. Rusz; Jacob N. Erlich

[57] ABSTRACT

A tool capable of efficiently and effectively lubricating control cables in hard to reach places. The lubrication tool has an elongated tubular member at one end thereof for attachment to a lubricant source and a cable engaging member at the other end thereof. The cable engaging member is of a semi-circular configuration having a sponge-like material therein for evenly distributing the lubricant about a cable.

1 Claim, 3 Drawing Figures

LUBRICATING TOOL FOR CONTROL CABLES

STATEMENT OF GOVERNMENT INTEREST

The invention described herein may be manufactured and used by or for the Government for governmental purposes without the payment of any royalty thereon.

BACKGROUND OF THE INVENTION

This invention relates generally to lubricating tools, and, in particular, to a lubricating tool which finds its main utility in the lubrication of aircraft control cables.

Cables form an essential component in many of todays mechanically activated devices. These devices range from heavy duty machinery, such as used in construction, to small and intricate machinery such as found in experimental-type equipment. A good example of such a mechanically activated device is found in the controls of aircraft. Cables control many of the essential operations of the aircraft and are capable of yielding performances which meet all the requirements of high speed flight.

In order for such control cables to maintain their efficiency of operation, a necessity during operation, it is essential that the cables remain well lubricated in order to avoid any snags or increased friction which can cause their ineffectual operation and eventual breakdown. Unfortunately, in many instances, it is impossible to continually lubricate these cables, especially when the cables are located in hard to reach places. Heretofore, much lubricant waste has been associated with the devices needing properly lubricated cables. As a result thereof, these devices which relied upon unlubricated control cables failed to meet acceptable standards.

SUMMARY OF THE INVENTION

The instant invention provides a lubricating tool which is capable of efficiently and properly lubricating cables, and, in particular, is capable of lubricating those cables found in hard to reach places, such as in aircraft. The lubrication tool of this invention is made up of a semi-circular shaped cable encompassing member operably connected to an adjustable holder. The holder takes the form of a swivel and a tubing of desired length.

The cable encompassing member of the lubricating tool is secured to a first tubing which is adjustably or swivelly and removably secured to a second elongated tubing. The second tubing member is adapted for connection to other tubing members if desired, or directly to a conventional lubricant source. Located within the semi-circular cable encompassing member is a sponge-like material which enables the semi-circular shaped member to closely and effectively encompass the cable to be lubricated. Lubricant is fed through the tubular members into the semi-circular member and is spread about the cable by the sponge-like material.

It is therefore an object of this invention to provide a lubricating tool which is capable of lubricating control cables located in hard to reach places.

It is another object of this invention to provide a lubricating tool which is adjustably mounted for ease of handling during operation thereof.

It is still a further object of this invention to provide a lubricating tool which is economical to produce and which utilizes conventional, currently available components that lend themselves to standard mass producing manufacturing techniques.

For a better understanding of the present invention together with other and further objects thereof reference is made to the following description taken in conjunction with the accompanying drawing and its scope will be pointed out in the appended claims.

DETAILED DESCRIPTION OF THE PREFERRED EMBODIMENT

Figure 1:
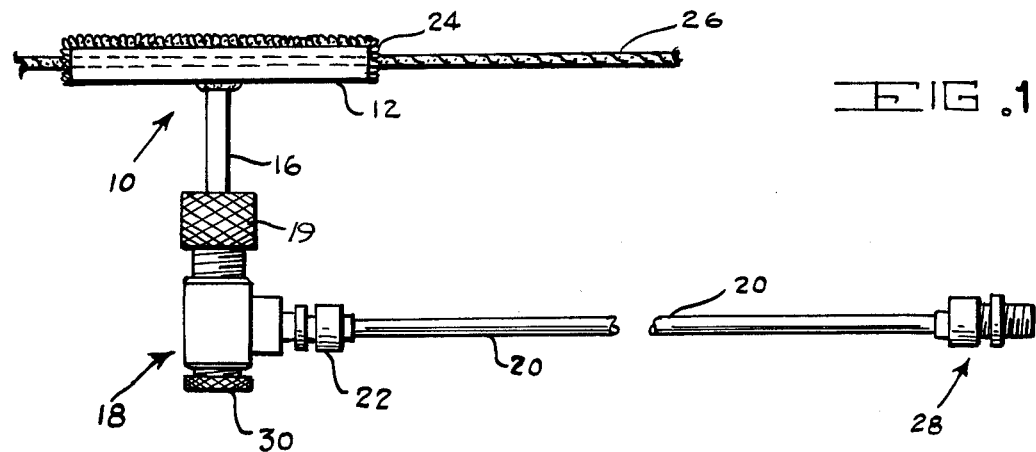
FIG. 1 is a side elevational view of the lubricating tool of this invention, shown in position about a cable.
Figure 2:
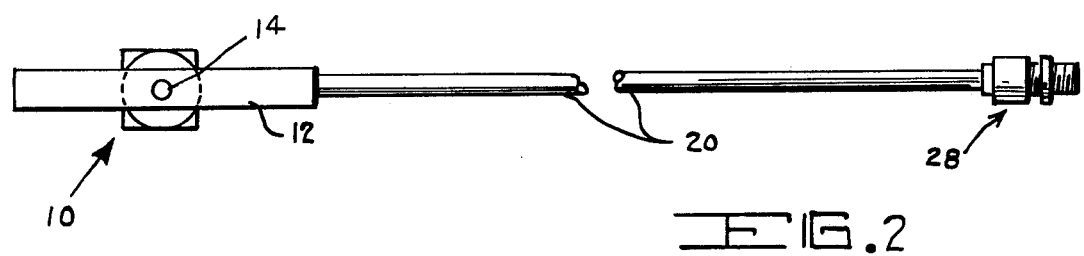
FIG. 2 is a top view of the lubricating tool of this invention.
Figure 3:
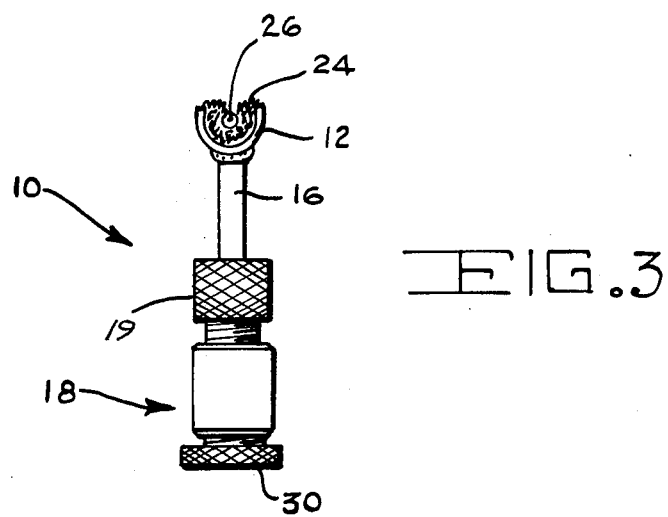
FIG. 3 is a front view of the lubricating tool of this invention.

The lubricating tool 10 of this invention is best shown in FIG. 1 of the drawings. Tool 10 is made up of a cable encompassing, semi-circular member 12 of any suitable material such as aluminum or plastic. Located centrally within member 12 (as shown in FIG. 2) is an aperture 14. Operatively connected to aperture 14 and secured to member 12 is a tubular member 16, secured to semi-circular shaped member 12 by any suitable securing method such as welding or the like.

Tube 16 is removably mounted within a swivel assembly 18 having a nut 19 for adjustable and rotatable mounting of member 12 thereto. Another piece of tubing or tubular member 20 is also removably and/or rotatably secured to swivel assembly 18 by any conventional nut 22. In this manner lubricant can be fed through tubing 20 by way of swivel fitting or assembly 18 through tubular member 16 through aperture 14 and into member 12.

Located within cable encompassing member 12 is any suitable sponge-like or porous material 24 utilized for resiliently encompassing a control cable 26. The sponge-like material 24 is held within semi-circular shaped member 12 by any suitable adhesive such as an epoxy resin and the entire member 12 along with tubular member 16 can be replaced with different sized and shaped members 12 in order to accommodate different sized cables 26. In addition, any number of tubings 20 can be utilized with the instant invention, being attached to one another by a conventional screw and nut arrangement 28.

When in operation the lubricating tool 10 of the instant invention can be attached to a lubricant source either by means of screw and nut arrangement 28 or directly to swivel assembly 18 by way of removable nut 30 located thereon. In addition tubular members 16 and 20 may be replaced by some resilient tubing in order to accommodate extremely difficult to reach cables.

During operation semi-circular shaped member 12 is positioned about a cable 26 to be lubricated and any suitable lubricant is fed through tube 20 into swivel assembly 18 and through tube 16 so as to exit through aperture 14 onto cable 26. During this operation the entire lubricating tool 10 is moved along cable 26 with the sponge-like material 24 evenly distributing the lubricant about cable 26. As a result thereof control cables 26 heretofore incapable of being lubricated can be now easily lubricated and thereby extending the life thereof.

Although the invention has been described with reference to a particular embodiment, it will be understood to those skilled in the art that this invention is capable of a variety of alternate embodiments within the spirit and scope of the appended claims.

I claim:

1. A tool for lubricating a cable comprising a member of semi-circular configuration capable of encompassing and being moved along the length of said cable, a sponge-like material located within said semi-circular member, said semicircular member having an aperture located therein adjacent said sponge-like material, a first tube being connected at one end thereof to said semi-circular member, said first tube being in operative alignment with said aperture, a swivel assembly being operatively connected to the other end of said first tube, a second tube being operatively connected at one end thereof to said swivel assembly and said swivel assembly having an auxiliary inlet therein whereby a lubricant source can be attached either to said other end of said second tube or directly to said auxiliary inlet of said swivel assembly thereby enabling lubricant to be fed through said swivel assembly to said first tube and said sponge-like material in said semi-circular member and onto said cable while said lubricating tool is being moved along the length of said cable.

* * * * *